United States Patent
Hodson et al.

(10) Patent No.: US 7,965,664 B2
(45) Date of Patent: Jun. 21, 2011

(54) APPARATUS AND METHOD FOR INTEGRATING WIRELESS FIELD DEVICES WITH A WIRED PROTOCOL IN A PROCESS CONTROL SYSTEM

(75) Inventors: William R. Hodson, Telford, PA (US); Yu-Gene T. Chen, Glendale, AZ (US); Prasad Samudrala, Bangalore (IN); Alexander Chernoguzov, Warrington, PA (US)

(73) Assignee: Honeywell International Inc., Morristown, NJ (US)

( * ) Notice: Subject to any disclaimer, the term of this patent is extended or adjusted under 35 U.S.C. 154(b) by 1034 days.

(21) Appl. No.: 11/444,200

(22) Filed: May 31, 2006

(65) Prior Publication Data

US 2007/0280144 A1    Dec. 6, 2007

(51) Int. Cl.
    *H04B 7/00*    (2006.01)
(52) U.S. Cl. .................. 370/310; 370/328; 370/338
(58) Field of Classification Search .............. 370/401, 370/402, 464–467, 310, 328, 338; 340/539.26, 340/3–3.9
    See application file for complete search history.

(56) References Cited

U.S. PATENT DOCUMENTS

| 6,424,872 B1 * | 7/2002 | Glanzer et al. .................. 700/18 |
| 6,847,316 B1 | 1/2005 | Keller |
| 2002/0120671 A1 | 8/2002 | Daffner et al. |
| 2002/0122230 A1 | 9/2002 | Izadpanah et al. |
| 2002/0147511 A1 * | 10/2002 | Eryurek et al. ................. 700/80 |
| 2003/0023795 A1 | 1/2003 | Packwood et al. |
| 2003/0204373 A1 * | 10/2003 | Zielinski et al. ............... 702/184 |
| 2004/0054782 A1 * | 3/2004 | Donze et al. .................. 709/227 |
| 2004/0196844 A1 | 10/2004 | Hagino |

(Continued)

FOREIGN PATENT DOCUMENTS

DE    103 14 721 A1    11/2004

(Continued)

OTHER PUBLICATIONS

International Search Report and Written Opinion of the International Searching Authority in PCT Application No. PCT/US2007/069717 dated Dec. 10, 2007.

(Continued)

*Primary Examiner* — Lester Kincaid
*Assistant Examiner* — Daniel Lai
(74) *Attorney, Agent, or Firm* — Munck Carter, LLP

(57) ABSTRACT

An apparatus is provided for facilitating integration of a wireless field device (such as a wireless sensor or actuator) and a wired protocol that is used in a process control system. The apparatus supports a wireless field device protocol for communicating with the wireless field device. The apparatus also supports a wired field device protocol for communicating with other components of the process control system over a network. The apparatus could map a wireless application model associated with the wireless field device protocol to a wired application model associated with the wired field device protocol. The apparatus could actually support multiple mappings from the wireless application model to wired application models associated with multiple wired field device protocols. As particular examples, the wired field device protocol(s) could include the HART, Foundation Fieldbus, Profibus, and/or Modbus protocols. The network could represent an Ethernet network or a serial network.

20 Claims, 5 Drawing Sheets

U.S. PATENT DOCUMENTS

| | | |
|---|---|---|
| 2004/0230899 A1 | 11/2004 | Pagnano et al. |
| 2004/0259533 A1 | 12/2004 | Nixon et al. |
| 2005/0141553 A1 | 6/2005 | Kim et al. |
| 2005/0228509 A1 | 10/2005 | James |
| 2007/0067458 A1 | 3/2007 | Chand |
| 2007/0153677 A1 | 7/2007 | McLaughlin et al. |
| 2007/0237137 A1 | 10/2007 | McLaughlin |

FOREIGN PATENT DOCUMENTS

| | | |
|---|---|---|
| EP | 1 401 171 A2 | 3/2004 |
| GB | 2427329 A | 12/2006 |
| WO | WO 01/35190 A2 | 5/2001 |
| WO | WO 03/079616 A1 | 9/2003 |
| WO | WO 2004/047385 A2 | 6/2004 |
| WO | WO 2006/017994 A1 | 2/2006 |
| WO | WO 2006/053041 A1 | 5/2006 |

OTHER PUBLICATIONS

International Search Report and Written Opinion of the International Searching Authority in PCT Application No. PCT/US2007/069614 dated Nov. 22, 2007.

Pereira J. M. D., "A fieldbus prototype for educational purposes", IEEE Instrumentation and Measurement Magazine, vol. 7, No. 1, Mar. 2004, pp. 24-31.

International Search Report and Written Opinion of the International Searching Authority in PCT Application No. PCT/US2007/069710 dated Nov. 27, 2007.

International Search Report and Written Opinion of the International Searching Authority in PCT Application No. PCT/US2007/069705 dated Apr. 15, 2008.

Aiello A et al., Wireless Distributed Measurement System by Using Mobile Devices, IEEE Workshop on Intelligent Data Acquisition, Sep. 2005, pp. 316-319.

* cited by examiner

APPARATUS AND METHOD FOR INTEGRATING WIRELESS FIELD DEVICES WITH A WIRED PROTOCOL IN A PROCESS CONTROL SYSTEM

CROSS-REFERENCE TO RELATED APPLICATIONS

This application is related to the following concurrently filed U.S. patent applications:

Ser. No. 11/444,044 entitled "APPARATUS AND METHOD FOR CONVERTING BETWEEN DEVICE DESCRIPTION LANGUAGES IN A PROCESS CONTROL SYSTEM";

Ser. No. 11/444,043 entitled "APPARATUS AND METHOD FOR INTEGRATING WIRELESS OR OTHER FIELD DEVICES IN A PROCESS CONTROL SYSTEM"; and Ser. No. 11/443,773 entitled "APPARATUS, SYSTEM, AND METHOD FOR INTEGRATING A WIRELESS NETWORK WITH WIRED FIELD DEVICES IN A PROCESS CONTROL SYSTEM";

all of which are hereby incorporated by reference.

TECHNICAL FIELD

This disclosure relates generally to control systems and more specifically to an apparatus and method for integrating wireless field devices with a wired protocol in a process control system.

BACKGROUND

Processing facilities are often managed using process control systems. Example processing facilities include manufacturing plants, chemical plants, crude oil refineries, and ore processing plants. Among other operations, process control systems typically interact with and control various field devices, such as sensors and actuators, in the processing facilities.

Wireless technology provides opportunities for process control systems to reduce instrumentation costs, such as by reducing the costs of installing and using sensors or other field devices in a control system. This reduction may, for example, be useful for less critical process measurements, where the costs of installing and using wired field devices may exceed the benefits provided by those wired field devices.

Wireless field devices often use different protocols than configuration tools, diagnostic and asset management systems, control and monitoring systems, or other components in a process control system. These other components in a process control system often use wired protocols to communicate. This often interferes with the ability to fully integrate and use wireless field devices in a process control system.

SUMMARY

This disclosure provides an apparatus and method for integrating wireless field devices with a wired protocol in a process control system.

In a first embodiment, a method includes receiving first information from a wireless field device in a process control system. The first information is associated with a wireless field device protocol. The method also includes converting the first information associated with the wireless field device protocol into second information associated with a wired field device protocol. In addition, the method includes communicating the second information over a network using the wired field device protocol.

In particular embodiments, converting the first information into the second information includes converting between a wireless application model associated with the wireless field device protocol and a wired application model associated with the wired field device protocol. A mapping that associates the wireless application model and the wired application model could be used to convert the first information into the second information. The mapping could represent one of a plurality of mappings, where the plurality of mappings associate the wireless application model and a plurality of wired application models associated with a plurality of wired field device protocols.

In a second embodiment, an apparatus includes at least one memory operable to store mapping information mapping a wireless application model associated with a wireless field device protocol and a wired application model associated with a wired field device protocol. The apparatus also includes at least one processor operable to receive first information from a wireless field device in a process control system. The first information is associated with the wireless field device protocol. The at least one processor is also operable to convert the first information associated with the wireless field device protocol into second information associated with the wired field device protocol using at least some of the mapping information. In addition, the at least one processor is operable to communicate the second information over a network using the wired field device protocol.

In a third embodiment, a computer program is embodied on a computer readable medium and is operable to be executed by a processor. The computer program includes computer readable program code for receiving first information from a wireless field device in a process control system. The first information is associated with a wireless field device protocol. The computer program also includes computer readable program code for converting the first information associated with the wireless field device protocol into second information associated with a wired field device protocol. In addition, the computer program includes computer readable program code for communicating the second information over a network using the wired field device protocol.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
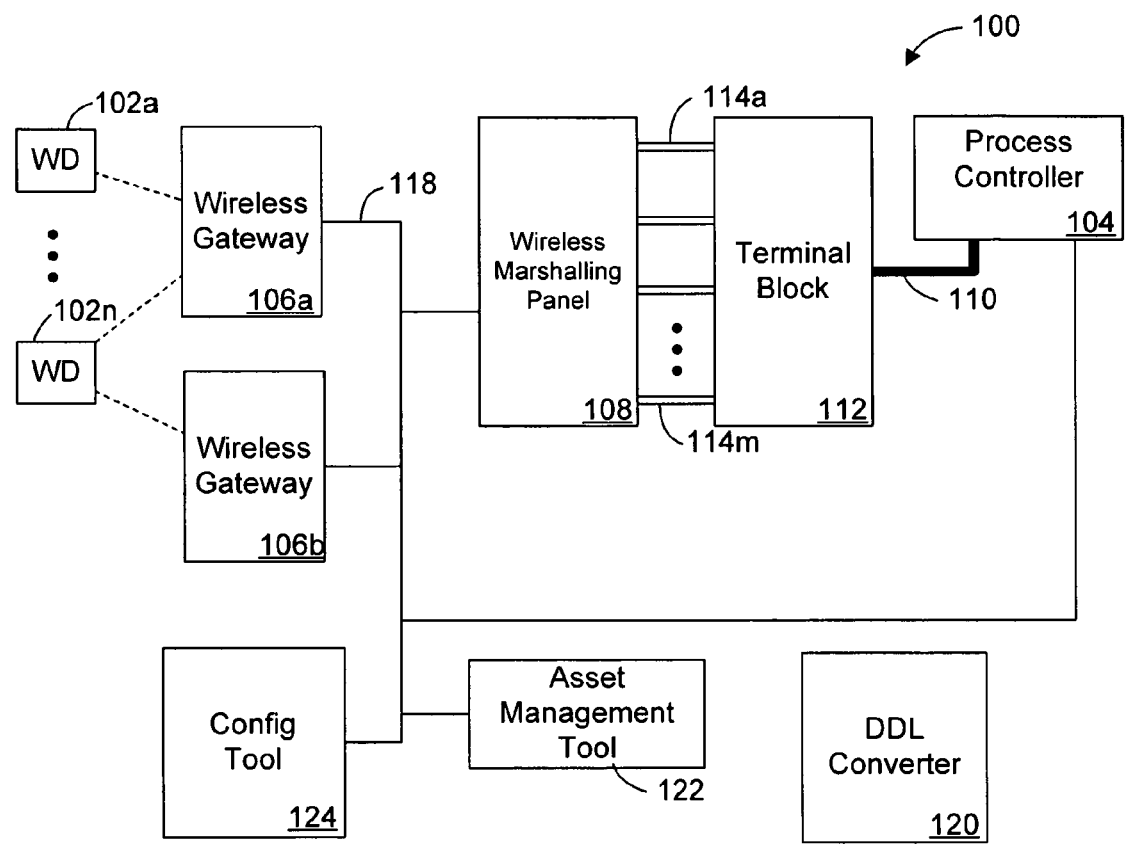
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example, the process control system 100 includes multiple wireless field devices 102a-102n. The wireless field devices 102a-102n represent components in a process or production system that may perform any of a wide variety of functions. For example, the wireless field devices 102a-102n could represent sensors capable of measuring one or more characteristics of a process or production system. The wireless field devices 102a-102n could also represent valves or other actuators capable of performing one or more actions that alter the process or production system. Each of the wireless field devices 102a-102n includes any suitable device or structure for performing one or more functions in a process or production system.

A process controller 104 controls the operation of the wireless field devices 102a-102n. For example, the process controller 104 may be capable of receiving data from one or more of the wireless field devices 102a-102n (such as sensors) and providing control signals to one or more of the wireless field devices 102a-102n (such as actuators). The process controller 104 includes any hardware, software, firmware, or combination thereof for controlling one or more of the wireless field devices 102a-102n.

In this example, the wireless field devices 102a-102n communicate with the process controller 104 through one or more wireless gateways 106a-106b and possibly a wireless marshalling panel 108. Each of the wireless gateways 106a-106b is capable of transmitting information wirelessly to and receiving information wirelessly from the wireless field devices 102a-102n. Each of the wireless gateways 106a-106b includes any device or structure for wirelessly communicating with one or more of the wireless field devices 102a-102n. Each of the wireless gateways 106a-106b could, for example, include one or more radio frequency (RF) transmitters, receivers, or transceivers.

The wireless marshalling panel 108 facilitates communication between the wireless field devices 102a-102n and the process controller 104. For example, the wireless marshalling panel 108 may enable the process controller 104 to communicate with the wireless field devices 102a-102n without requiring the process controller 104 to understand the communication protocol(s) used by the wireless field devices 102a-102n.

As a particular example, the process controller 104 could support the Highway Addressable Remote Transducer (HART) protocol, where signals for field devices are transmitted by the process controller 104 over a multi-conductor cable 110 to a terminal block 112. The terminal block 112 separates the signals for the field devices into wire pairs 114a-114m, where each wire pair is associated with a different field device. In these embodiments, the wireless marshalling panel 108 could convert HART-compliant signals received from the process controller 104 into messages sent to the wireless gateways 106a-106b. The wireless marshalling panel 108 could also convert messages from the wireless gateways 106a-106b into HART-compliant signals sent to the process controller 104. The use of the multi-conductor cable 110 and terminal block 112 with the HART protocol is for illustration only. Any other input/output technique and/or communication network could be used with the HART protocol.

The wireless marshalling panel 108 could include any device or structure facilitating communication between the wireless field devices 102a-102n (via the gateways 106a-106b) and the process controller 104. Additional details regarding the wireless marshalling panel 108 can be found in U.S. patent application Ser. No. 11/394,947 entitled "APPARATUS, SYSTEM, AND METHOD FOR INTEGRATION OF WIRELESS DEVICES WITH A DISTRIBUTED CONTROL SYSTEM," which is hereby incorporated by reference. The wireless marshalling panel 108 could support the use of any suitable field device protocol(s), such as HART, FF HSE, FF H1, Modbus, Profibus, and WorldFIP. In this document, the phrase "field device protocol" refers to any protocol(s) for communicating with one or more field devices in a control system (whether or not the field devices of the control system actually use that protocol).

A network 118 couples various components in the process control system 100. The network 118 represents any suitable computing or communication network capable of transporting data, such as one or more local area networks (LANs), metropolitan area networks (MANs), wide area networks (WANs), all or a portion of a global network such as the Internet, or any other communication system or systems at one or more locations. As particular examples, the network 118 could represent an RS-485 network or an Ethernet network. The network 118 could also represent a redundant set of networks, such as a pair of Ethernet networks forming a Fault Tolerant Ethernet (FTE) network.

Each of the wireless field devices 102a-102n could have any number of operational parameters, such as tunings, performance statistics, statuses, measurements, and other data of interest. The number of parameters could be rather large, such as dozens, hundreds, or even more. For the process controller 104 to effectively interact with and control the wireless field devices 102a-102n, a device description language (DDL) file for each wireless field device can be defined. The DDL file for a wireless field device typically represents a text-based or other language file that describes the characteristics of a field device, such as the parameters of that field device. The DDL files for field devices are often generated by the manufacturers of those field devices.

Some, many, or all of the DDL files associated with the field devices 102a-102n could be generated using proprietary, non-standard, or undesirable languages. As shown in FIG. 1, a DDL converter 120 is capable of converting DDL files associated with the wireless field devices 102a-102n into standard, accepted, widely utilized, or specified DDL files. As an example, a wireless field device 102a could represent a field device using the WIRELESS NETWORK FOR SECURE INDUSTRIAL APPLICATION (WNSIA) protocol from HONEYWELL INTERNATIONAL INC., and the wireless field device 102a could have an associated WNSIA DDL file. The WNSIA DDL file may use or be associated with a non-standard language in the control system 100 (although the WNSIA DDL could represent a standard or desired DDL in a control system). The DDL converter 120 could convert the WNSIA DDL file into a HART DDL file, a FF DDL file, a Profibus DDL or GSD file, or some other DDL file. The newly-generated DDL file may then be compiled using a tokenizer or other program, which compiles the DDL file into binary form for later interpretation or execution. In other embodiments, the DDL converter 120 could operate directly on binary files, such as by converting WNSIA DDL binary files to binary files compliant with other protocols.

In this way, a suitable DDL file for each field device may be available for use in the process control system 100. For example, the DDL files generated by the DDL converter 120 could be used in the process control system 100 to ensure that the process controller 104, an asset management tool 122, or a configuration tool 124 can interact with the wireless field devices 102a-102n. The DDL converter 120 includes any hardware, software, firmware, or combination thereof for converting information associated with one DDL to information associated with a different DDL. The configuration tool 124 may represent a tool used to provide configuration information to components of the process control system 100, allowing the components to be configured or controlled. While shown as forming part of the process control system 100, the DDL converter 120 need not reside in a process control system 100. The DDL converter 120 could, for example, be used by a manufacturer that produces field devices (such as wireless sensors or actuators) for process control systems.

In one aspect of operation, the wireless gateways 106a-106b communicate with the wireless field devices 102a-102n using a wireless protocol and with the network 118 using a different protocol. For example, the wireless gateways 106a-106b could communicate with the wireless field devices 102a-102n using the WNSIA protocol. The wireless gateways 106a-106b could also communicate over the network 118 using one or more Ethernet or serial protocols, such as HART, FF, Profinet, or Modbus.

In these embodiments, the wireless gateways 106a-106b may include mapping information or other logic that allows the wireless field devices 102a-102n to communicate with other components in the process control system 100 using one or more wired protocols. For example, the wireless gateways 106a-106b could convert between the wireless application model used by the wireless field devices and the application model(s) of one or more wired protocols. From the perspective of other components in the process control system 100, the wireless field devices 102a-102n appear to use a wired protocol supported by the wireless gateways 106a-106b, such as standard wired protocols like HART.

In this way, other components in the process control system 100 can interact with and control the wireless field devices 102a-102n using one or more wired protocols. As a particular example, the asset management tool 122 and the configuration tool 124 could interact with the field devices 102a-102n as if the field devices 102a-102n supported the HART protocol. The other components in the process control system 100 are not required to support the wireless protocol used by the wireless field devices 102a-102n.

While this disclosure may use the WNSIA protocol as an example of a wireless protocol, this is for illustration only. In other embodiments, one or more of the wireless field devices 102a-102n could use a different wireless protocol. Moreover, the different wireless protocol could represent any suitable protocol, including proprietary, standard, or widely-available protocols. The wireless gateways 106a-106b may therefore be capable of converting between any wireless protocol used by one or more wireless field devices 102a-102n and any wired protocol supported in the process control system 100.

Although FIG. 1 illustrates one example of a process control system 100, various changes may be made to FIG. 1. For example, a control system could include any number of field devices (including wired and/or wireless field devices), controllers, gateways, wireless marshalling panels, terminal blocks, tools, and DDL converters. Also, the system 100 could include any number and type of connections between the wireless marshalling panel 108 and the process controller 104. Further, FIG. 1 illustrates one functional division between components in the system 100. However, various components in FIG. 1 could be combined or further subdivided, such as by combining the DDL converter 120 and the configuration tool 124 into a single physical unit. Various components could also be omitted from the system 100 if their functionality is not desired or required in a particular implementation. In addition, FIG. 1 illustrates one operational environment in which wireless field devices may be integrated with one or more wired protocols. This integration functionality could be used in any other suitable device or system.

Figure 2:
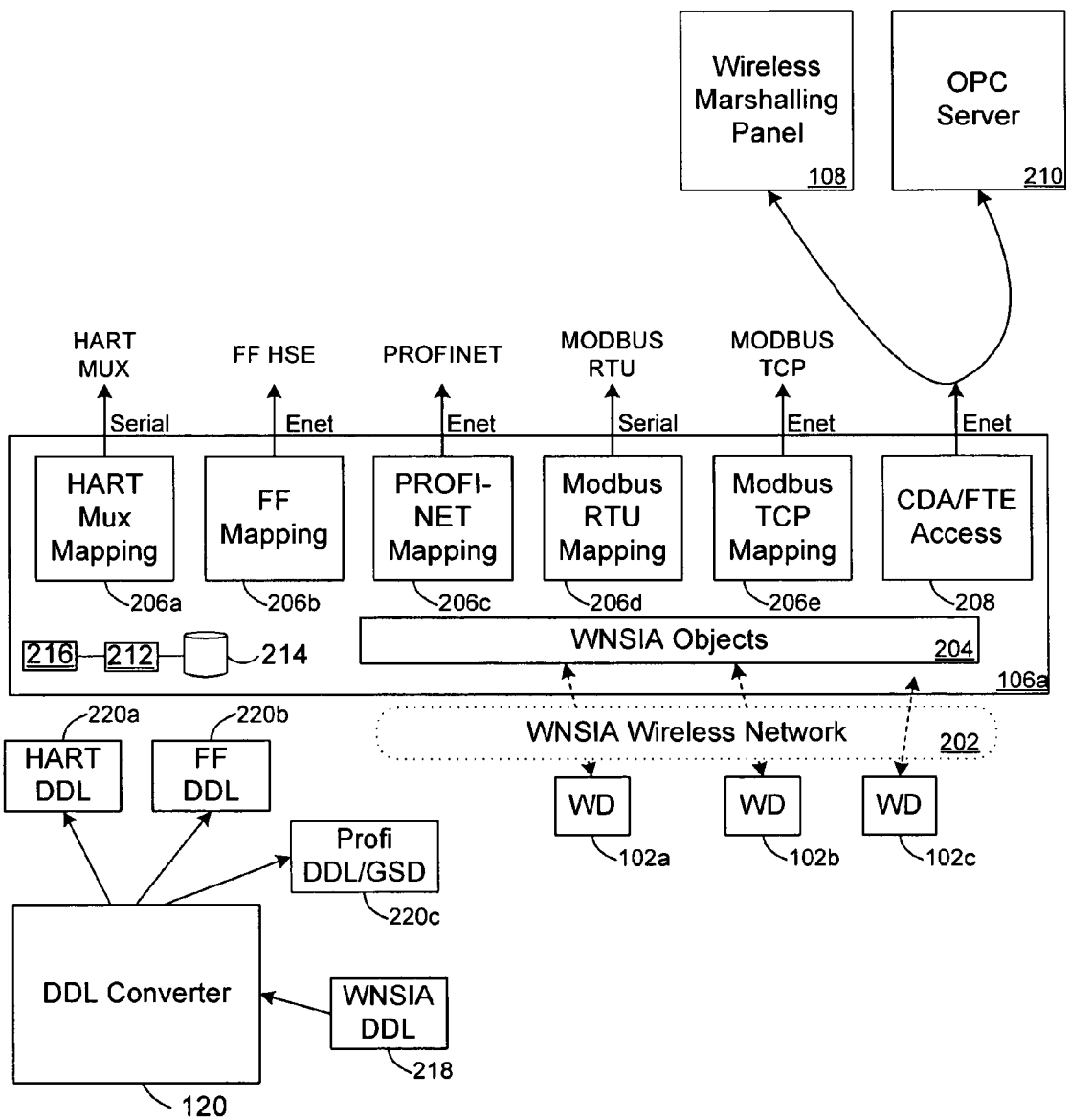
FIG. 2 illustrates additional details of an example process control system according to one embodiment of this disclosure.

FIG. 2 illustrates additional details of an example process control system 100 according to one embodiment of this disclosure. In particular, FIG. 2 illustrates additional details regarding the arrangement and operation of the wireless gateway 106a and the DDL converter 120. The additional details shown in FIG. 2 are for illustration only. The process control system 100 could have other wireless gateways or DDL converters without departing from the scope of this disclosure. Also, for ease of explanation, the wireless gateway 106a and the DDL converter 120 are described as operating in the process control system 100 of FIG. 1. The wireless gateway 106a and the DDL converter 120 could be used in any other suitable system.

In this example, three wireless field devices 102a-102c represent WNSIA field devices that communicate with the wireless gateway 106a over a WNSIA wireless network 202. This indicates that the wireless field devices 102a-102c and the wireless gateway 106a communicate using a WNSIA wireless protocol. The WNSIA wireless network 202 could represent any suitable network, such as a 56 Mbps 802.11 wireless network.

Figure 4:
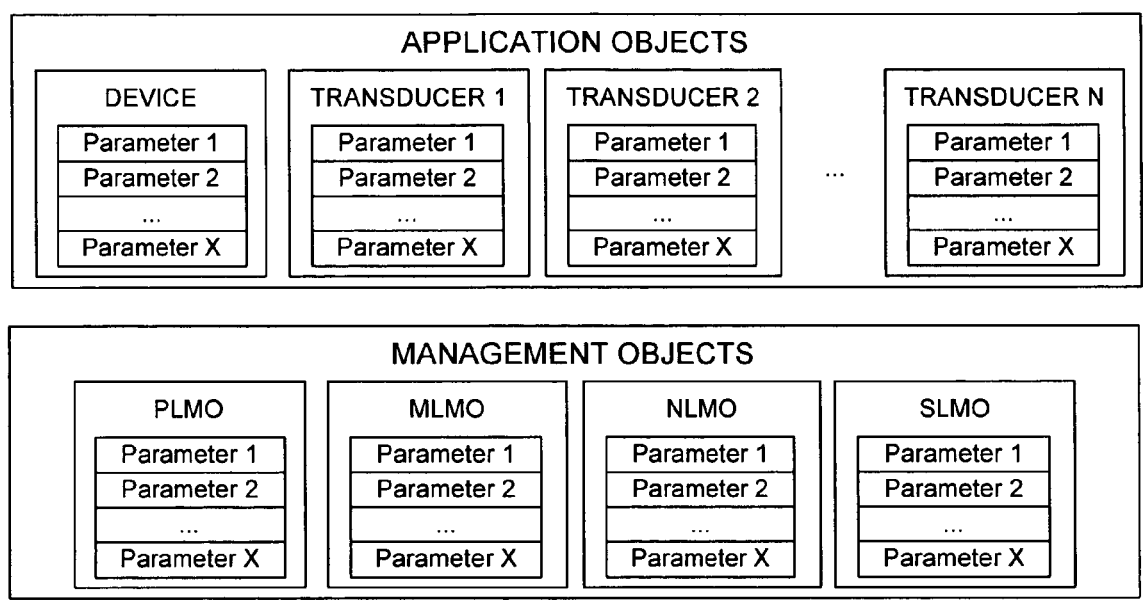
FIGS. 4 through 6 illustrate example details of a wireless protocol used in a process control system according to one embodiment of this disclosure.
Figure 5:
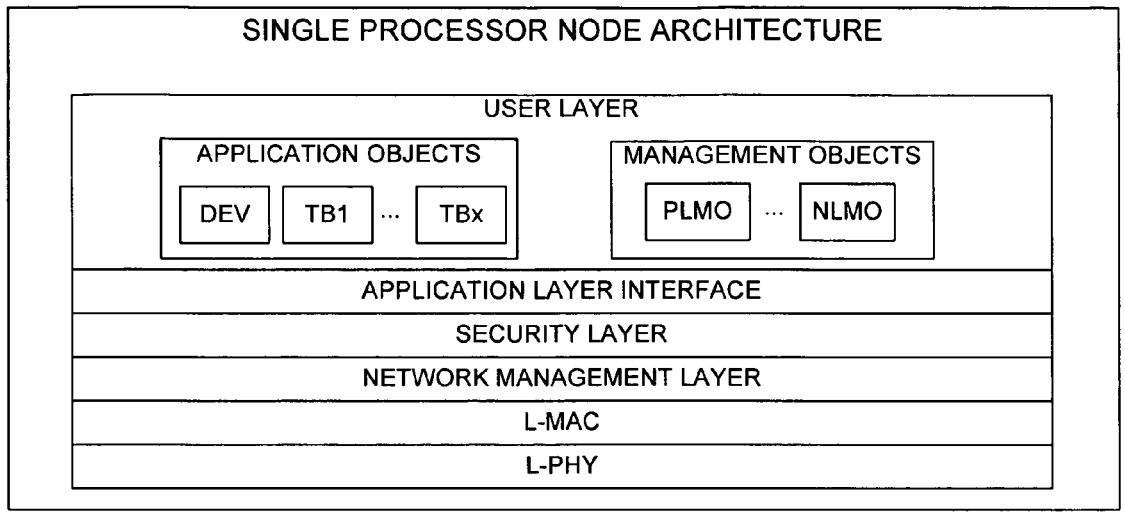
Figure 6:
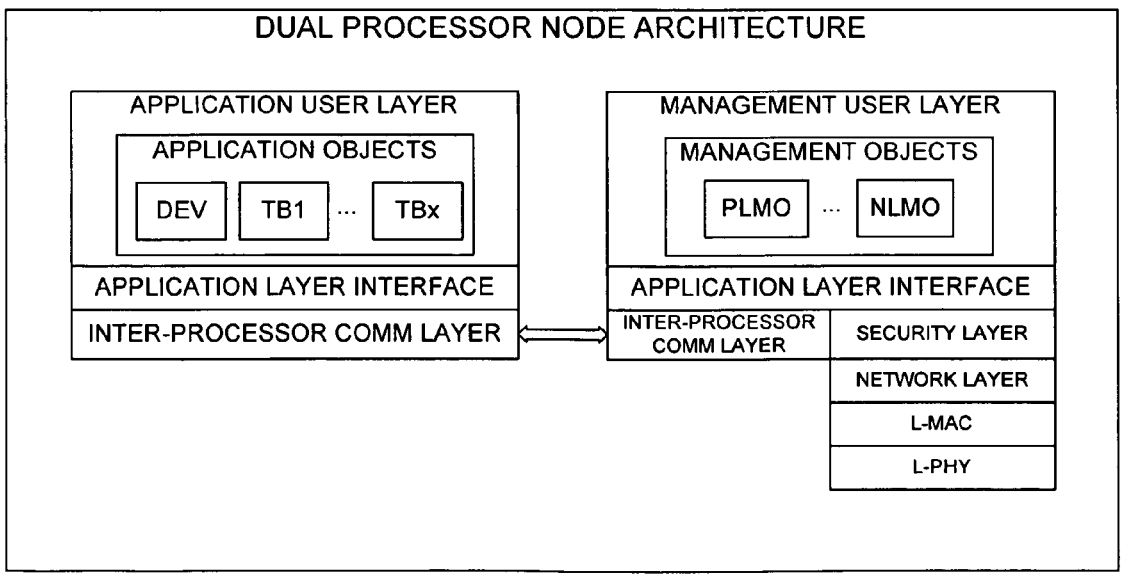

As shown in FIG. 2, the wireless gateway 106a includes WNSIA objects 204. The WNSIA objects 204 generally represent a wireless application model, which defines how wireless communication with the field devices 102a-102c occurs. For example, the WNSIA objects 204 could define the messages that are used to transmit data to the wireless field devices 102a-102c. The WNSIA objects 204 could also define the messages containing data that are received from the wireless field devices 102a-102c, allowing relevant data to be extracted from the received messages. Additional details regarding the WNSIA protocol (and its associated object model) are shown in FIGS. 4 through 6, which are described below. Although shown as using WNSIA objects 204 to support a WNSIA wireless network 202, the wireless gateway 106a could support any other or additional type(s) of wireless network(s) for communication with the wireless field devices 102a-102c.

The wireless gateway 106a also includes various mappings 206a-206e. The mappings 206a-206e map the wireless application model (of the wireless network 202) to application models of standard, desired, or other wired protocols. In other words, the mappings 206a-206e define how data from the wireless field devices 102a-102c can be converted into wired protocols, and vice versa. For example, a HART multiplexer mapping 206a defines how data from the wireless field devices 102a-102c can be converted into a serial HART-compliant data stream (as if the gateway 106a was a HART multiplexer). The HART multiplexer mapping 206a also defines how data in a serial HART-compliant data stream can be extracted for transmission to the wireless field devices 102a-102c. The mappings 206b-206c represent similar mappings used with the FF HSE and Profibus protocols, respectively. The mappings 206d-206e represent similar mappings used with the Modbus Remote Terminal Unit (RTU) protocol and the Modbus Transmission Control Protocol (TCP), respectively.

In addition to the mappings 206a-206e, the gateway 106a includes a Control Data Access (CDA) or Fault Tolerant Ethernet (FTE) access module 208. The CDA/FTE access module 208 supports access to other components in the process control system 100, such as the wireless marshalling panel 108 or an OLE Process Control (OPC) server 210. The CDA/FTE access module 208 could operate in a similar manner as the mappings 206a-206e, such as by formatting data for transmission from the gateway 106a and extracting data from messages received by the gateway 106a. While shown as providing access to a wireless marshalling panel 108 and an OPC server 210, this or any other access module 208 could provide access to these or any other or additional components in the process control system 100.

In this example, the wireless gateway 106a includes one or more processors 212 and one or more memories 214 storing data and instructions used by the processor(s) 212 (such as the objects, mappings, and integration software). Also, the wireless gateway 106a includes at least one interface 216, which may allow the wireless gateway 106a to communicate with other components of the process control system 100. The interface(s) 216 could represent any suitable interface, such as an Ethernet interface and/or a serial interface. The interface(s) 216 could also include RF transceivers or other wireless equipment for communicating with the wireless field devices. Additional details regarding the integration of wireless field devices with a wired protocol are shown in FIG. 3, which is described below.

In order to properly communicate or interact with the wireless field devices 102a-102c, a DDL file for each wireless field device may be used. If one or more of the DDL files use an undesired or unexpected format or protocol, the DDL converter 120 may convert the DDL file(s) into a standard, desired, expected, or specified format or protocol. For example, the DDL converter 120 could receive a WNSIA DDL file 218, which may be associated with one or more of the wireless field devices 102a-102c. The DDL converter 120 could examine the WNSIA DDL file 218, break the WNSIA DDL file 218 down into its components, and reconstruct the components into one or more converted DDL files 220a-220c. The converted DDL files 220a-220c represent DDL files containing the logic or content of the original DDL file 218 expressed in a different format or protocol. In this example, the DDL converter 120 converts the WNSIA DDL file 218 into one or more of a HART DDL file 220a, a FF DDL file 220b, and a Profibus DDL or GSD file 220c. This is for illustration only. The DDL converter 120 could convert any suitable DDL file 218 into any suitable converted DDL file or files 220a-220c. Additional details regarding the operation of the DDL converter 120 can be found in U.S. patent application Ser. No. 11/444,044, which has been incorporated by reference above.

Although FIG. 2 illustrates additional details of one example embodiment of a process control system 100, various changes may be made to FIG. 2. For example, the gateway 106a could support any other or additional wireless protocol(s) and any other or additional mapping(s) or access module(s) associated with wired protocol(s). Also, the DDL converter 120 may be capable of converting DDL files from any other or additional format or protocol into any other or additional format or protocol.

Figure 3:
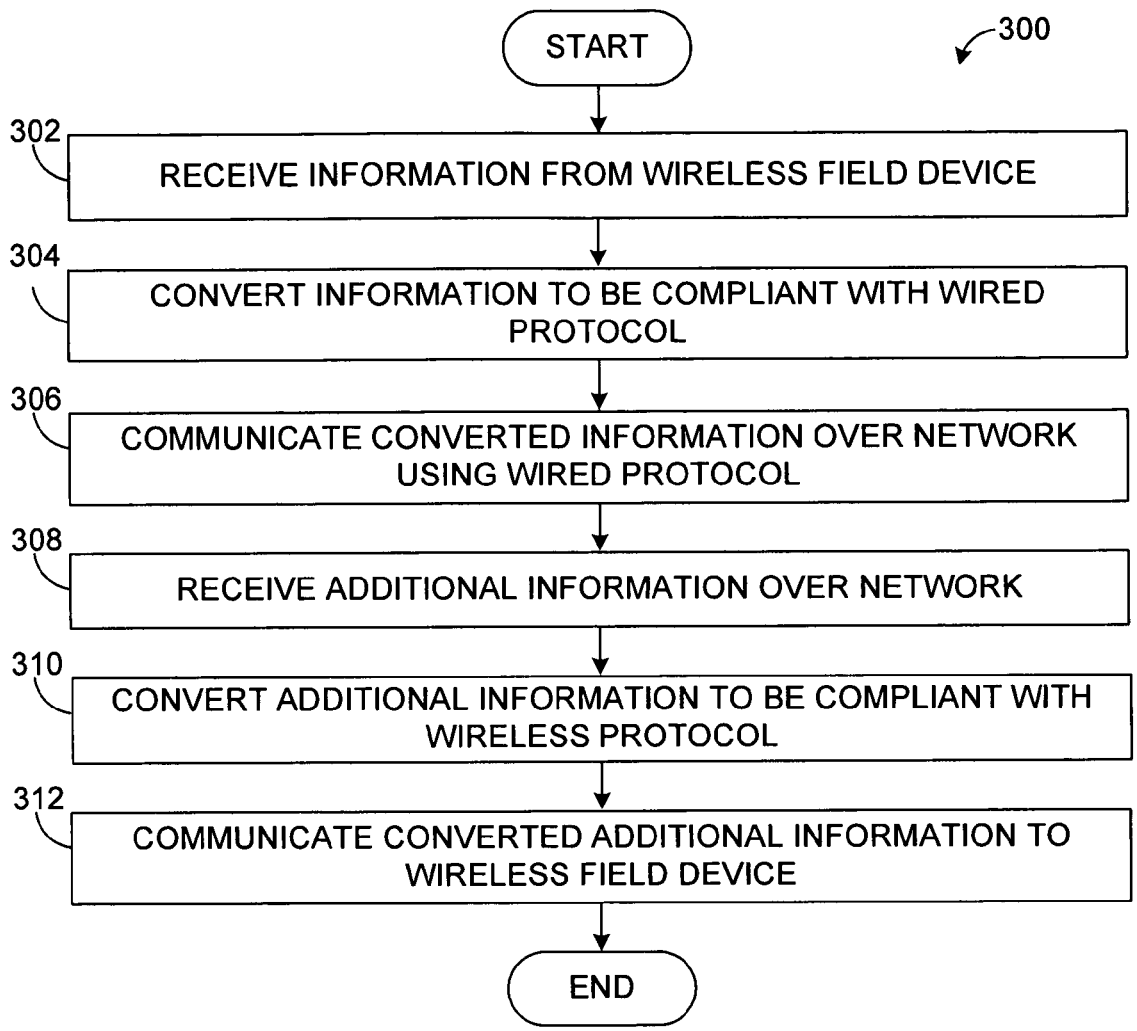
FIG. 3 illustrates an example method for integrating wireless field devices with a wired protocol in a process control system according to one embodiment of this disclosure.

FIG. 3 illustrates an example method 300 for integrating wireless field devices with a wired protocol in a process control system according to one embodiment of this disclosure. For ease of explanation, the method 300 is described with respect to the wireless gateway 106a of FIG. 2 operating in the process control system 100 of FIG. 1. The method 300 could be used by any other suitable device and in any other suitable system.

The wireless gateway 106a receives information from a wireless field device at step 302. This may include, for example, the wireless gateway 106a receiving information complaint with the WNSIA protocol from a wireless field device. As a particular example, messages received from the wireless field device could be compliant with the WNSIA objects 204, which can be used to extract specific data from the messages.

The wireless gateway 106a converts the received information into information compliant with a wired protocol at step 304. This may include, for example, the wireless gateway 106a converting the information from the WNSIA wireless field device into information compliant with HART, FF, Profibus, or Modbus. In particular embodiments, the wireless gateway 106a uses one or more of the mappings 206a-206e or the access module 208 to convert WNSIA messages from the wireless field device into messages compliant with one or more of the HART, FF, Profibus, and Modbus protocols.

The wireless gateway 106a communicates the converted information over a network using the wired protocol at step 306. This may include, for example, the wireless gateway 106a transmitting the converted information over an Ethernet network or a serial network.

The wireless gateway 106a may receive additional information over the network for the wireless field device at step 308. This may include, for example, the wireless gateway 106a receiving additional information for the wireless field device over a serial network or an Ethernet network. The additional information could originate from any suitable source, such as the process controller 104, the asset management tool 122, or the configuration tool 124. The additional information is received using the wired protocol.

The wireless gateway 106a converts the additional information into information suitable for transmission to the wireless field device at step 310. This may include, for example, the wireless gateway 106a converting HART, FF, Profibus, or Modbus information into information compliant with a wireless protocol. In particular embodiments, the wireless gateway 106a uses one or more of the mappings 206a-206e or the access module 208 to convert HART, FF, Profibus, or Modbus messages from the wired protocol into the WNSIA protocol.

The wireless gateway 106a communicates the converted additional information to the wireless field device at step 312. This may include, for example, the wireless gateway 106a transmitting WNSIA-compliant messages to the wireless field device. The messages are sent to the wireless field device using wireless communications.

Although FIG. 3 illustrates one example of a method 300 for integrating wireless field devices with a wired protocol in a process control system, various changes may be made to FIG. 3. For example, the wireless gateway 106a could convert between any suitable protocols and is not limited to use with the WNSIA, HART, FF, Profibus, and Modbus protocols. Also, the wireless gateway 106a could convert the information during steps 302-306 without converting the additional information during steps 308-312, or vice versa.

FIGS. 4 through 6 illustrate example details of the WNSIA protocol used in the process control system 100 according to one embodiment of this disclosure. The details shown in FIGS. 4 through 6 represent example details of the WNSIA protocol only. The WNSIA protocol could be modified to operate in different ways without departing from the scope of this disclosure. Also, different wireless protocols could be used in the process control system 100.

As shown in FIG. 4, the WNSIA object model is based on an object-parameter paradigm. Everything within a WNSIA device, including the device itself, is represented by an object. Each object can be categorized as an application object or a management object. In this example, each analog input transducer, analog output transducer, digital or binary input transducer, and digital or binary output transducer is represented by an application object. Each of these application objects contains a set of parameters describing the device or transducer. Also, a physical layer management object (PLMO), Medium Access Control (MAC) layer management object (MLMO), network layer management object (NLMO), and security layer management object (SLMO) are included in the management objects. These management objects are used to manage or control different layers of a communication network stack.

As shown in FIG. 5, if implemented on a single processor, the application objects reside in a user layer. The user layer resides above an Application Interface Layer (AIL), which resides above a complete network stack (including Security, Network, and Physical layers). Management objects representing the various communication stack layers can also be viewed as residing above the AIL.

As shown in FIG. 6, management objects can be implemented on a different processor than the application objects. In this example, the AIL can be viewed as being composed of two parts. One part includes an application user layer and the AIL, which are provided by an application processor. Another part includes a management user layer, the AIL, and the remaining layers of the network stack, which are provided by a network processor. The different AIL portions shown in FIG. 6 are distributed between two or more processors and may communicate with each other over one or more AIL extension channels. These channels may be built on top of any suitable inter-processor communication (IPC) mechanism, such as Ethernet or serial communications.

Each one of the six layers shown in FIGS. 5 and 6 (user, application interface, security, network, L-MAC, L-PHY) may have an interface between itself and an adjacent layer. For example, an application interface may be defined between the user and application interface layers. A security interface may be defined between the application interface and security layers. A network interface may be defined between the security and network layers. A MAC interface may be defined between the network and L-MAC layers. A PHY interface may be defined between the L-MAC and L-PHY layers. In particular embodiments, the application interface is defined and consistent for all WNSIA field devices, while the remaining interfaces are internal and may be implemented differently as long as any applicable RF frames and MAC/PHY requirements are met. The interfaces between the different layers could, for example, be implemented using a set of Application Programming Interface (API) calls, using message passing, or using an IPC mechanism.

Returning to FIG. 4, a hierarchical addressing model may be used to access device data of WNSIA field devices. The top of the hierarchy may be a 16-bit device address. Objects within a device may be identified by an 8-bit object identifier (object ID). Parameters within an object may be identified by a parameter number. Parameters that are arrays or structures may be supported in the same manner as in Foundation Fieldbus. Individual array or structure elements may be accessed by specifying an 8-bit element index.

Management objects may represent different layers of the wireless communication stack. The physical layer management object (PLMO) may contain attributes of the wireless physical communication layer. A MAC layer management object may contain attributes of the wireless MAC layer. There are also management objects for the network layer and security layer, as well as possibly other management objects. In particular embodiments, management objects within leaf nodes (sensors and actuators) and infrastructure nodes (routing nodes used to route wireless traffic) may be fully specified and fixed, and device vendors may not extend their functionality. Management objects, in addition to parameters, may define one or more function codes that can be invoked by other objects within the same node or from a different node. Function calls could be numbered (such as from 1 to 255).

A sensor application may include a device object, a firmware download object, and one or more transducer blocks. Any number of transducer block types could be supported, such as analog input transducer blocks (AITB), analog output transducer blocks (AOTB), binary input transducer blocks (BITB), and binary output transducer blocks (BOTB). Each transducer block could correspond to a single process variable or a single output variable. Multivariable sensors may be implemented using multiple AITBs and/or multiple BITBs for each of their measurements. A device block could be associated with an object ID of one. An application firmware download object could be associated with an object ID of two. Transducer blocks may use object ID numbers of three and higher. Management objects may have fixed object ID values starting at 255 and decreasing. Table 1 illustrates a possible association of object IDs with objects.

TABLE 1

| Object ID | Object |
|---|---|
| 1 | Device Object |
| 2 | Application Firmware Download Object |
| 3 | Analog Input Transducer Block 1 |
| 4 | Analog Input Transducer Block 2 |
| ... | ... |
| 244 | Infrastructure Node Physical Layer Management Object |
| 245 | Infrastructure Node MAC Layer Management Object |
| 246 | Leaf Node Physical Layer Management Object |
| 247 | Leaf Node MAC Layer Management Object |
| 248 | Network Layer Management Object |
| 249 | Security Layer Management Object |
| 250 | Device Layer Management Object (DLMO) |
| 251 | Management (Radio Communication) Firmware Download Object |
| 252 | Alert Report Management Object |
| 253 | Reserved |
| 254 | Reserved |
| 255 | Reserved |

The first parameter within a transducer block may be a process variable or output variable (based on the transducer type). Several other parameters following the first parameter may be standard. In addition to the standard parameters, transducer blocks could contain vendor-specific parameters (such as up to 255 total parameters). WNSIA sensor devices may provide measurements in engineering units, and process variable or output variable parameters may use Foundation Fieldbus value-status structures. For example, AITBs and AOTBs may use the Foundation Fieldbus DS-65 data structure, and BITBs and BOTBs may use the Foundation Fieldbus DS-66 data structure for their PV_D and OP_D parameters. The DS-66 data structure may be limited to Boolean values, multi-state discrete values may not be supported, and any non-FALSE value may be treated as TRUE. Floating point numbers may be in the IEEE756 format.

Scalar values and one-dimensional arrays and structures are supported in the WNSIA protocol. Scalar parameters within an object may be uniquely identified by a parameter number, and a parameter index may be ignored if one is specified. Arrays and structures are also supported in the WNSIA protocol, and they may be supported in the same manner as in the Foundation Fieldbus protocols. A one-based index could be used to identify a specific array or structure element. An index of zero may address an entire array or structure as a whole.

To facilitate data access of a WNSIA field device, a parameter class describing a parameter change frequency may be defined as follows. A dynamic (D) parameter class description typically represents a measurement or computed value that changes every time a device executes its algorithm or obtains a new measurement. A static (S) parameter class description typically represents a configuration parameter that only changes when written from an external source or that changes infrequently. A constant (C) parameter class description typically represents a description type parameter identifying a device's physical properties or capabilities that do not change. In particular embodiments, every change to a static parameter may result in incrementing a ST_REV parameter of either a WNSIA device object or the DLMO to indicate that a static parameter has changed. Devices observing the ST_REV parameter can detect a change and refresh a static parameter database accordingly.

WNSIA field device parameters may be further classified by access specification. For example, each parameter could fall into one of three groups, namely read-only (RO), write-only (WO), or read-write (RW). An error may be generated in response to an attempt to write data to a read-only parameter or an attempt to read data from a write-only parameter.

In particular embodiments, the data types used in WNSIA devices may represent a subset of the FF-defined data types. Table 2 summarizes the simple data types defined by FF that could be used in WNSIA devices.

TABLE 2

| Data Type | Index | Number of Octets |
|---|---|---|
| Boolean | 1 | 1 |
| Int8 | 2 | 1 |
| Int16 | 3 | 2 |
| Int32 | 4 | 4 |
| UInt8 | 5 | 1 |
| UInt16 | 6 | 2 |
| UInt32 | 7 | 4 |
| Float32 | 8 | 4 |
| String | 9 | 1-32 |
| Blob | 10 | 1-32 |
| Date | 11 | 7 |
| TimeDif | 13 | 4 or 6 |
| Bitstring | 14 | 1-4 |
| Time | 21 | 8 |

Table 3 identifies a subset of the FF-defined standard data structures that could be used in WNSIA devices.

TABLE 3

| Data Type | Index | Number of Octets |
|---|---|---|
| Value & Status - Float | 65 | 5 |
| Value & Status - Boolean | 66 | 2 |
| Scaling | 68 | 11 |

A new non-FF data type may be designed to describe connection endpoints. The data type could be specified as "Connection Endpoint" with an index value of "320" and a size of 8 octets. Data structure types may be referred to using the "DS-xx" nomenclature, where DS stands for Data Structure and xx is the type number (the index value).

As described above, a status byte may be used to describe the status of a process variable. In particular embodiments, a process variable status byte includes three bit-fields as shown in Table 4. These fields may represent a consistent subset of the Foundation Fieldbus, HART, and OPC status byte practices.

TABLE 4

| Bit 7 Bit 6 Quality | Bit 5 Reserved | Bit 4 Bit 3 Bit 2 Sub-Status | Bit 1 Bit 0 Limit Status |
|---|---|---|---|
| 0 - Bad | 0 | 0 - Non-specific<br>1 - Configuration error<br>3 - Device failure<br>4 - Sensor failure<br>7 - Out of service<br>x - Other values reserved | 0 - Not limited<br>1 - Low limited<br>2 - High limited<br>3 - Constant (high and low limited) |
| 1 - Uncertain | | 0 - Non-specific<br>4 - Sensor conversion not accurate<br>5 - Range limits exceeded<br>x - Other values reserved | |
| 2 - Good | | 0 - No special condition exists<br>x - Other values reserved | |
| 3 - Reserved | | Reserved | |

A Mode parameter in each transducer block may represent an 8-bit integer with an enumerated set of values. The Mode parameter may be defined as a subset of the FF mode definition. There could be no distinction between target and actual modes. There may also be no concept of normal or permitted modes. In some embodiments, two modes are defined, namely an Out of Service (OOS) mode and an Automatic (AUTO) mode. In particular embodiments, an 8-bit value is associated with the Mode parameter, where bit 7 (the most significant bit) corresponds to the OOS mode, bit 3 corresponds to the AUTO mode, and all other bits are reserved (and may be set to 0). This 8-bit value could be represented by an unsigned integer (UInt8), where the OOS mode corresponds to a decimal value of 128 and the AUTO mode corresponds to a decimal value of 8. All bits in the Mode parameter value could be mutually exclusive (i.e. the Mode parameter is not a bit string). Other modes, such as manual, local override, or cascade, may be added using the reserved bits.

The Mode parameter in the transducer blocks may be related to alarm processing. Setting the Mode parameter to OOS (inactivating a block) may cause all active alarms to return to normal, and corresponding reports are published on the network. Activating a device or setting its Mode parameter to a value other than OOS causes the device to process its alarm conditions and generate alarm reports for those that are active. The Mode parameter may also be related to data publications. If a connection is configured and a transducer is publishing its process variable, setting the Mode parameter to OOS may not stop the publication. Rather, the data quality may be changed to "Bad" with a sub-status of "Out of Service."

As noted above, a WNSIA device object may be used to represent a WNSIA field device. Table 5 illustrates the various parameters of a standard WNSIA device object.

TABLE 5

| # | Name | Data Type | CLS | ACC | Description |
|---|---|---|---|---|---|
| 1 | ST_REV | UInt16 | D | RO | Static data revision for entire device application process. Change of static data member in application object increments this. |
| 2 | TAG_DESC | String | S | RW | 32-character string containing device tag descriptor. |
| 3 | VENDOR | String | C | RO | 32-character string identifying device vendor. |
| 4 | MODEL | String | C | RO | 32-character string identifying device model. |
| 5 | SERIALNUM | UInt32 | C | RO | 32-bit device serial number. |
| 6 | DEVREV | UInt16 | C | RO | 16-bit revision number. |
| 7 | BUILD | UInt16 | C | RO | 16-bit software build number. |
| 8 | DEV_STATUS | Bit-string | D | RO | 32-bit bitstring indicating device error and status conditions. |
| 9 | NUMTB | UInt8 | C | RO | Number of transducer blocks in device. |
| 10 | TBTYPE | UInt8 | C | RO | Array of transducer types. Array size is the NUMTB parameter. Each array element can be one of: AITB = 0, AOTB = 1, BITB = 2, and BOTB = 3. |
| 11 | WITK_VER | UInt16 | C | RO | Wireless interoperability test kit revision that the device complies with. |
| 12 | ALLOW_EHM_ACC | Boolean | S | RW | Enable Equipment Health Monitoring (EHM) tools to access device data - read, write, and method execution. EHM tools cannot change this parameter. It can only be set by plant operators. |
| 13 | Reserved | | | | Reserved |
| 14 | Reserved | | | | Reserved |
| 15 | Reserved | | | | Reserved |
| 16 | Reserved | | | | Reserved |
| 17 | Reserved | | | | Reserved |
| 18 | Reserved | | | | Reserved |
| 19 | Reserved | | | | Reserved |

Here, "CLS" represents the parameter class description (dynamic, static, constant), and "ACC" represents the access specification (read-only, write-only, read-write).

The Vendor, Model, DevRev, and SerialNum parameters may serve several purposes related to device identification. For example, the Vendor-Model-SerialNum triplet may uniquely identify a given physical device, which can be used during the device commissioning process to map a device configured offline to an actual piece of hardware. As another example, the Vendor-Model-DevRev triplet combined with a DDRev parameter (identifying a device descriptor file revision) may uniquely identify a device descriptor required to create a system template for a given device. The DD revision (DDRev) may allow for the ability to update DD files that correspond to the same version of device firmware. As yet another example, the Vendor-Model-DevRev-Build combination may uniquely identify a device's firmware. These relationships are summarized in Table 6.

TABLE 6

| | Device Hardware | Device Firmware | DD |
|---|---|---|---|
| Vendor | X | X | X |
| Model | X | X | X |
| SerialNum | X | | |
| DevRev | | X | X |
| DDRev | | | X |
| Build | | X | |

The Build parameter may be used to reflect a device firmware version. While a change in DevRev may necessitate a new DD revision, the Build number can be incremented independently of the DD changes. Also, the Build, DevRev, and DDRev parameters may provide two degrees of freedom, namely an ability to change DD files without releasing new device firmware and an ability to change device firmware without releasing new DD files. The Build numbering may be relative to the DevRev value. In other words, firmware with a different DevRev revision may use the same Build to identify its firmware build variant within a device revision family. In particular embodiments, any set of DD files with the same DevRev value can be used to represent a device in a host system, where the highest DDRev value for a given DevRev value is the most recent DD revision.

A device application may contain at least one firmware download object, which is used to upgrade the device application over a wireless connection. Multi-processor devices can contain multiple firmware download objects, such as when a dual-processor device with a sensor/actuator application on one processor and a radio communication stack on another processor contains two firmware download objects (one for upgrading the sensor/actuator software, another for upgrading the radio communication stack). Table 7 illustrates the parameters of a firmware download object (which might not be extensible by vendors).

TABLE 7

| # | Name | Data Type | CLS | ACC | Description |
|---|------|-----------|-----|-----|-------------|
| 1 | FW_DLD_CMD | UInt16 | S | RW | Firmware download command. Valid values are DLD_START = 1, DLD_ABORT = 2, and DLD_ACTIVATE = 3. |
| 2 | FW_DLD_STAT | UInt16 | D | RO | Firmware download status. Valid values are DLD_INACTIVE = 1, DLD_ACTIVE = 2, DLD_OK = 3, and DLD_ERROR = 4. |
| 3 | FW_DLD_ERR | UInt16 | D | RO | Vendor-defined firmware download error code. Zero indicates no error. |
| 4 | FW_DLD_PREP_TO | UInt16 | C | RO | Time in seconds for device to prepare for download. |
| 5 | FW_DLD_ACT_TO | UInt16 | C | RO | Time in seconds for device to activate new firmware. |
| 6 | FW_DLD | Blob | S | WO | Parameter for storing device application firmware packets. |

Table 8 identifies the parameters in an analog input transducer block.

TABLE 8

| # | Name | Data Type | CLS | ACC | Description |
|---|------|-----------|-----|-----|-------------|
| 1 | PV | DS-65 | D | RO | Measurement variable in engineering units of the sensor. |
| 2 | MODE | UInt8 | D | RW | Transducer mode |
| 3 | OUTCONN | DS-320 | S | RW | Output connection specification for process variable. |
| 4 | SCALE | DS-68 | S | RW | Range and units of the measurement variable. |
| 5 | Reserved | | | | Reserved |

Table 9 identifies the parameters in a binary input transducer block.

TABLE 9

| # | Name | Data Type | CLS | ACC | Description |
|---|------|-----------|-----|-----|-------------|
| 1 | PV_B | DS-66 | D | RO | Discrete measurement variable. |
| 2 | MODE | UInt8 | D | RW | Transducer mode |
| 3 | OUTCONN | DS-320 | S | RW | Output connection specification for process variable. |
| 4 | Reserved | | | | Reserved |
| 5 | Reserved | | | | Reserved |

Table 10 identifies the parameters in an analog output transducer block.

TABLE 10

| # | Name | Data Type | CLS | ACC | Description |
|---|------|-----------|-----|-----|-------------|
| 1 | OP | DS-65 | D | RW | Output value for the actuator. |
| 2 | MODE | UInt8 | D | RW | Transducer mode |
| 3 | INCONN | DS-320 | S | RW | Input connection specification for output variable. |
| 4 | READBACK | DS-65 | D | RO | Readback value of the actual position of the actuator. |
| 5 | OUTCONN | DS-320 | S | RW | Output connection specification for READBACK. |
| 6 | SCALE | DS-68 | S | RW | Range and units of the output variable. |
| 7 | Reserved | | | | Reserved |
| 8 | Reserved | | | | Reserved |
| 9 | Reserved | | | | Reserved |

Table 11 identifies the parameters in a binary output transducer block.

TABLE 11

| # | Name | Data Type | CLS | ACC | Description |
|---|---|---|---|---|---|
| 1 | OP_B | DS-66 | D | RW | Output value for the actuator. |
| 2 | MODE | UInt8 | D | RW | Transducer mode |
| 3 | INCONN | DS-320 | S | RW | Input connection specification for output variable. |
| 4 | READBACK_B | DS-66 | D | RO | Readback value of the actual position of the actuator. |
| 5 | OUTCONN | DS-320 | S | RW | Output connection specification for READBACK. |
| 6 | Reserved | | | | Reserved |
| 7 | Reserved | | | | Reserved |
| 8 | Reserved | | | | Reserved |
| 9 | Reserved | | | | Reserved |

In some embodiments, WNSIA device vendors are required to provide device descriptors for their WNSIA devices. The device descriptors define the number of transducer blocks, their types, and all parameters of each transducer block. The Foundation Fieldbus DDL specifications may be used to define the device descriptors for the WNSIA devices. As a result, developers may develop WNSIA device descriptors using the FF tokenizer toolkit and the FF standard DD library toolkit from the Fieldbus Foundation. Developers may develop devices (such as the gateways 106a-106b) that communicate with WNSIA field devices using the FF DD services toolkit from the Fieldbus Foundation.

In particular embodiments, the WNSIA device descriptors may include a subset of the DDL constructs defined in the FF DDL specification (such as Specification FF-900, which is hereby incorporated by reference). For example, the DDL constructs that may be used in WNSIA device descriptors could include the BLOCK, VARIABLE, MENU, EDIT-DISPLAY, METHOD, RELATION, UNIT, REFRESH, WRITE-AS-ONE, ITEM-ARRAY, COLLECTION, RECORD, ARRAY, RESPONSE CODE, LIKE keyword, and EXPRESSION constructs. As another example, the DDL constructs that may not be used in WNSIA device descriptors could include the PROGRAM, DOMAIN, VARIABLE LIST, OPEN/CLOSE keywords, and possibly CONDITIONAL constructs.

To facilitate the generation of WNSIA device descriptors by vendors, manufacturers, or other entities associated with wireless field devices, standard wireless DD files could be made available or provided to the entities. These standard DD files could be provided for each transducer block type (analog input, analog output, digital input, digital output), and the standard files may be imported into WNSIA device DDL source files. The vendors, manufacturers, or other entities could add their own device-specific parameters to the standard DD files, such as by using the ADD, DELETE, and REDEFINE DDL constructs to add, delete, or modify the attributes of a block. The vendors, manufacturers, or other entities could be prevented from deleting any of the standard or required attributes of the imported standard DD files (although they could be redefined using the REDEFINE construct). The Foundation Fieldbus Specification FF-901 (which is hereby incorporated by reference) provides additional information about these constructs and their attributes.

DD developers could rely on a set of specifications, tools, and standard files to produce WNSIA device descriptors. The standard specifications may include the FF DDL source language specification, which specifies a structured text language used to define the meaning and relationships between available wireless field device data. It also specifies the syntax of the language used in WNSIA DDL source files. Another standard specification is the FF DDL binary encoding specification, which specifies a standard encoding of DDL source files into a binary file format. Device specifications could also be used, where the device specifications are used to customize standard wireless DDL files and produce vendor-, manufacturer-, or other entity-specific device descriptors for given device types. Once created, DDL source files may be tokenized into binary format and delivered to a host system, which uses FF DD services libraries to interpret information contained in the binary WNSIA DDL files.

Although FIGS. 4 through 6 illustrate example details of the WNSIA protocol used in the process control system 100, various changes may be made to FIGS. 4 through 6. For example, other or additional divisions between objects could be used in place of or in addition to the divisions shown in FIG. 4. Also, other or additional protocol stacks could be used in place of or in addition to the stacks shown in FIGS. 5 and 6. In addition, other or additional parameters could be contained in the tables described above.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
receiving first information from a wireless field device in a process control system, the first information associated with a wireless field device protocol;
converting the first information associated with the wireless field device protocol into second information associated with a wired field device protocol; and
communicating the second information over a network using the wired field device protocol;
wherein, under the wireless field device protocol, an object is associated with the wireless field device and one or more objects are associated with one or more transducers of the wireless field device, each transducer associated with a process or output variable, each object comprising one or more parameters storing values describing the associated device or transducer;
wherein the first information received from the wireless field device comprises a device address identifying the wireless field device, an object identifier identifying one of the objects associated with the identified wireless field device or with the one or more transducers of the wireless field device, and a parameter identifier identifying one of the parameters within the identified object;
wherein the parameters describing the wireless field device comprise a vendor identifier, a model identifier, a device revision identifier, a software build identifier, and a device descriptor file revision identifier; and
wherein the method further comprises:
using the vendor identifier, the model identifier, the device revision identifier, and the software build identifier to identify firmware for the field device; and
using the vendor identifier, the model identifier, the device revision identifier, and the device descriptor file revision identifier to identify a device descriptor file for the field device.

2. The method of claim 1, wherein converting the first information into the second information comprises converting between a wireless application model associated with the wireless field device protocol and a wired application model associated with the wired field device protocol.

3. The method of claim 2, wherein converting the first information into the second information comprises using a mapping that associates the wireless application model and the wired application model.

4. The method of claim 3, wherein the mapping comprises one of a plurality of mappings, the plurality of mappings associating the wireless application model and a plurality of wired application models associated with a plurality of wired field device protocols.

5. The method of claim 1, further comprising:
receiving third information associated with the wired field device protocol over the network;
converting the third information associated with the wired field device protocol into fourth information associated with the wireless field device protocol; and
communicating the fourth information to the wireless field device using the wireless field device protocol;
wherein the fourth information communicated to the wireless field device comprises the device address identifying the wireless field device, a second object identifier identifying a second one of the objects associated with the identified wireless field device, and a second parameter identifier identifying a second one of the parameters associated with the identified object.

6. The method of claim 1, wherein the wired field device protocol comprises at least one of: a Highway Addressable Remote Transducer protocol, a Foundation Fieldbus protocol, a Profibus protocol, and a Modbus protocol.

7. The method of claim 1, wherein the network comprises at least one of: an Ethernet network and a serial network.

8. The method of claim 1, wherein one or more firmware download objects are associated with the field device and configured to upgrade a device application over a wireless connection.

9. An apparatus, comprising:
at least one memory operable to store mapping information mapping a wireless application model associated with a wireless field device protocol and a wired application model associated with a wired field device protocol; and
at least one processor operable to:
receive first information from a wireless field device in a process control system, the first information associated with the wireless field device protocol;
convert the first information associated with the wireless field device protocol into second information associated with the wired field device protocol using at least some of the mapping information; and
communicate the second information over a network using the wired field device protocol;
wherein, under the wireless field device protocol, an object is associated with the wireless field device and one or more objects are associated with one or more transducers of the wireless field device, each transducer associated with a process or output variable, each object comprising one or more parameters for storing values describing the associated device or transducer;
wherein the at least one processor is operable to receive the first information from the wireless field device, the first information comprising a device address identifying the wireless field device, an object identifier identifying one of the objects associated with the identified wireless field device or with the one or more transducers of the wireless field device, and a parameter identifier identifying one of the parameters within the identified object;
wherein the parameters describing the wireless field device comprise a vendor identifier, a model identifier, a device revision identifier, a software build identifier, and a device descriptor file revision identifier; and
wherein the at least one processor is further configured to use the vendor identifier, the model identifier, the device revision identifier, and the software build identifier to identify firmware for the field device and to use the vendor identifier, the model identifier, the device revision identifier, and the device descriptor file revision identifier to identify a device descriptor file for the field device.

10. The apparatus of claim 9, wherein the at least one memory is operable to store mapping information mapping the wireless application model and a plurality of wired application models, the plurality of wired application models associated with a plurality of wired field device protocols.

11. The apparatus of claim 9, wherein the at least one processor is further operable to:
receive third information associated with the wired field device protocol over the network;
convert the third information associated with the wired field device protocol into fourth information associated with the wireless field device protocol using at least some of the mapping information; and
communicate the fourth information to the wireless field device using the wireless field device protocol, wherein the at least one processor is operable to communicate the fourth information to the wireless field device, the fourth information comprising the device address identifying the wireless field device, a second object identifier identifying a second one of the objects associated with the identified wireless field device, and a second parameter identifier identifying a second one of the parameters associated with the identified object.

12. The apparatus of claim 9, wherein the wired field device protocol comprises at least one of: a Highway Addressable Remote Transducer protocol, a Foundation Fieldbus protocol, a Profibus protocol, and a Modbus protocol.

13. The apparatus of claim 9, further comprising at least one interface operable to facilitate communication over the network, the at least one interface comprising at least one of: an Ethernet interface and a serial interface.

14. The apparatus of claim 9, wherein:
the one or more parameters in a first of the objects comprise a vendor name, a model name, and a serial number associated with the wireless field device; and
the one or more parameters in a second of the objects comprise one or more parameters associated with an input block or an output block in the process control system.

15. The apparatus of claim 9, wherein the wireless application model further comprises a plurality of management objects, the management objects comprising a physical layer management object, a Medium Access Control (MAC) layer management object, a network layer management object, and a security layer management object.

16. The apparatus of claim 9, wherein one or more firmware download objects are associated with the field device and configured to upgrade a device application over a wireless connection.

17. A tangible computer readable medium embodying a computer program, the computer program comprising computer readable program code for:
receiving first information from a wireless field device in a process control system, the first information associated with a wireless field device protocol;
converting the first information associated with the wireless field device protocol into second information associated with a wired field device protocol; and
communicating the second information over a network using the wired field device protocol,
wherein, under the wireless field device protocol, an object is associated with the wireless field device and one or more objects are associated with one or more transducers of the wireless field device, each transducer associated with a process or output variable, each object comprising one or more parameters for storing values describing the associated device or transducer;
wherein the computer readable program code for receiving the first information from the wireless field device comprises computer readable program code for receiving a device address identifying the wireless field device, an object identifier identifying one of the objects associated with the identified wireless field device or with the one or more transducers of the wireless field device, and a parameter identifier identifying one of the parameters within the identified object;
wherein the parameters describing the wireless field device comprise a vendor identifier, a model identifier, a device revision identifier, a software build identifier, and a device descriptor file revision identifier; and
wherein the computer program further comprises computer readable program code for:
using the vendor identifier, the model identifier, the device revision identifier, and the software build identifier to identify firmware for the field device; and
using the vendor identifier, the model identifier, the device revision identifier, and the device descriptor file revision identifier to identify a device descriptor file for the field device.

18. The tangible computer readable medium of claim 17, wherein the computer readable program code for converting the first information into the second information comprises computer readable program code for converting between a wireless application model associated with the wireless field device protocol and one of a plurality of wired application models associated with one of a plurality of wired field device protocols.

19. The tangible computer readable medium of claim 18, further comprising computer readable program code for:
receiving third information associated with the wired field device protocol over the network;
converting the third information associated with the wired field device protocol into fourth information associated with the wireless field device protocol; and
communicating the fourth information to the wireless field device using the wireless field device protocol,
wherein the computer readable program code for communicating the fourth information to the wireless field device comprises computer readable program code for sending the device address identifying the wireless field device, a second object identifier identifying a second one of the objects associated with the identified wireless field device, and a second parameter identifier identifying a second one of the parameters associated with the identified object.

20. The tangible computer readable medium of claim 18, wherein:
the wireless application model comprises a plurality of application objects and a plurality of management objects;
the application objects comprise a first object associated with the wireless field device and a second object associated with each input and output of the wireless field device; and
the management objects comprise a physical layer management object, a Medium Access Control (MAC) layer management object, a network layer management object, and a security layer management object.

* * * * *